Oct. 20, 1936.  M. CHARLES  2,058,060
BRAKING DEVICE
Filed July 18, 1934  2 Sheets-Sheet 1
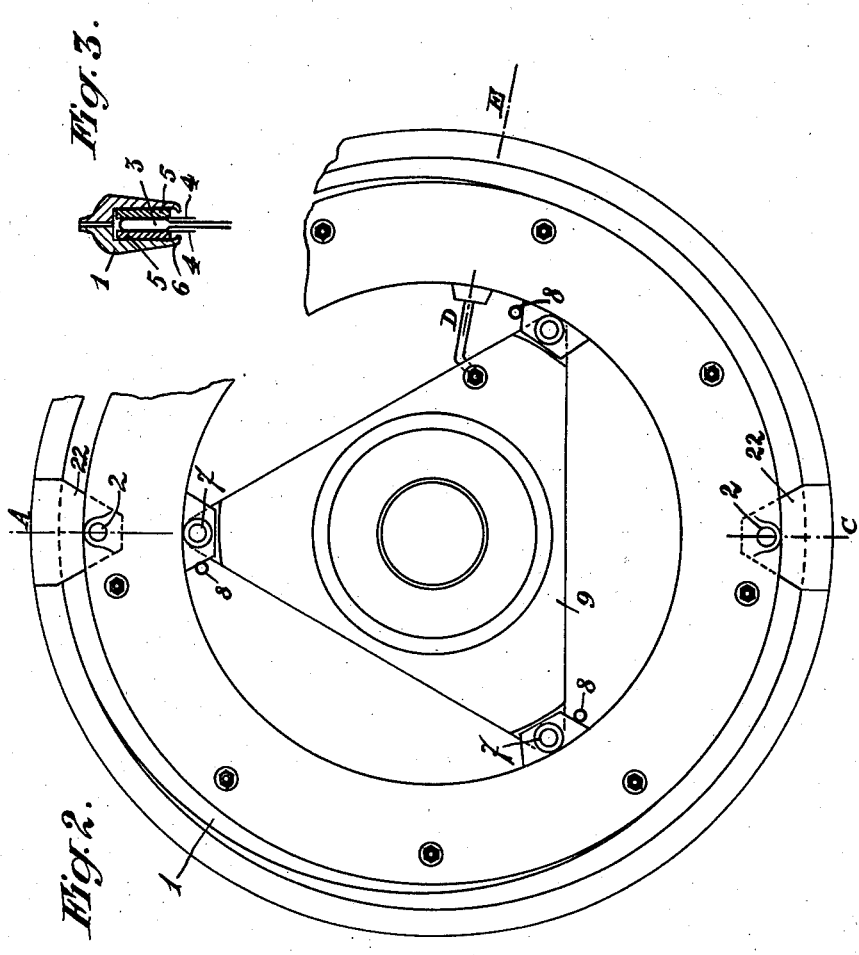
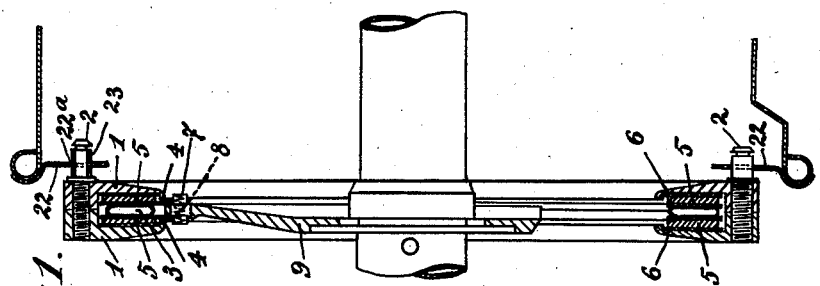
Inventor:
Maurice Charles
By Mauro & Lewis
Attorneys

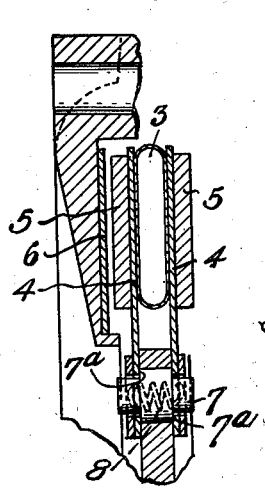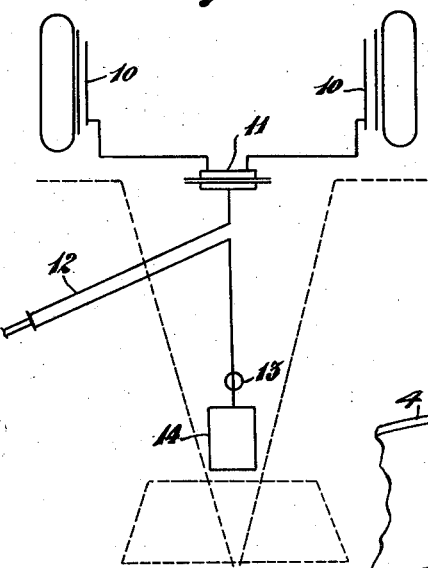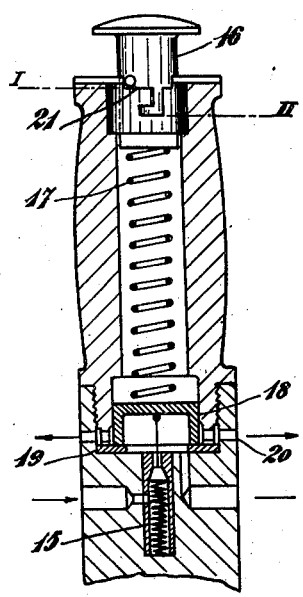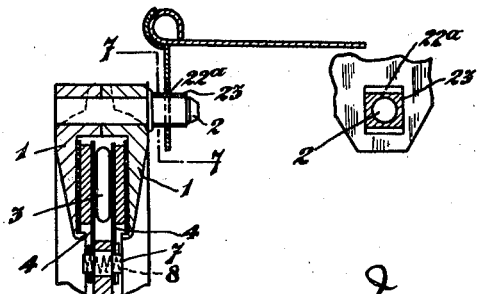

Patented Oct. 20, 1936

2,058,060

UNITED STATES PATENT OFFICE 2,058,060

BRAKING DEVICE

Maurice Charles, Courbevoie, France

Application July 18, 1934, Serial No. 735,883
In France August 8, 1933

1 Claim. (Cl. 188—72)

The present invention relates to braking devices for vehicles (airplanes, automobiles, etc.) of the kind in which at least one disc rotatable together with a wheel is adapted to be brought into frictional braking engagement with a non-rotatable member, by axial displacement under the control of an expansible element.

The essential feature of the present invention consists in providing two friction plates, one on each side of said expansible member or element, said plates being carried by a non-rotatable part in such manner as to be prevented from rotating about the axis of the wheel but to be slidable parallelly to said axis, elastic means being provided in such manner as to urge said plates toward each other.

According to a preferred embodiment of the invention said friction plates are slidable along three pins parallel to the axis of the wheel and carried by a support fixed to the frame or non-rotatable axle of the wheel.

Owing to this arrangement the frictional engagement of the parts of the braking device ceases as soon as the expansible element is deflated, a feature which is of special importance in the case of braking devices for airplanes.

Other features of the present invention will result from the following detailed description of a specific embodiment thereof.

A preferred embodiment of the present invention will be hereinafter described with reference to the accompanying drawings, given merely by way of example, and in which:

Fig. 1 is a cross section of the brake mounted on the axle and on a spoke wheel;

Fig. 2 is a side elevational view of the braking device, partly in section;

Fig. 3 is a sectional view of the valve of the braking device, on the line D—E of Fig. 2;

Fig. 4 is the diagram of an arrangement of the braking device according to the present invention on an airplane;

Fig. 5 is a sectional view of a pressure-relief valve;

Fig. 6 is a view on an enlarged scale of the upper part of Fig. 1;

Fig. 7 is a sectional view on the line 7—7 of Fig. 6;

Fig. 8 is an enlarged sectional view corresponding to a portion of Fig. 6;

Fig. 9 is a side view corresponding to Fig. 8.

The braking device illustrated by the drawings includes a movable casing 1 (Figs. 1, 2 and 3) driven by the wheel. This casing, which is made of a light alloy and consists of two symmetrical parts, surrounds an expansible chamber 3 (made of india-rubber, metal, etc.) which, under the effect of the pressure of a fluid fed thereinto, moves elements 4 away from each other. These elements 4 consist of ring-shaped plates 4 carrying braking members 5.

During the braking action, these braking members 5 are applied against two frictional surfaces 6 fixed on the inside of the casing. The expansible chamber can be thermically insulated from these ring-shaped plates. These plates are mounted in such manner as to be able to slide freely on three spindles 7 mounted on a disc or support 9 fixed to the axle of the chassis. These spindles 7 prevent plates 4 from rotating and permit them to move axially under the effect of the pressure of the fluid. Springs 8 tend to force plates 4 toward each other and against the shoulder 7ª provided on spindles 7 (Fig. 8).

It will be readily understood that spindles 7 prevent ring-shaped plates 4 from rotating together with the wheel and guide them perfectly during their sliding movement. At the moment of braking, the forcing apart of plates 4, caused by the increase of volume of the expansible chamber 3, forces the linings 5 of said plates 4 against the frictional surfaces 6 secured on the inner walls of casing 1.

As soon as the braking effort ceases, the springs 8 force the plates 4 back into their initial position against shoulders 7ª, the brake linings being then no longer in contact with the surfaces 6 of the casing.

The movable casing 1 is driven by the wheel through the following device:

The casing is provided with two pins or fingers 2, disposed at the respective ends of a diameter thereof.

The wheel is provided with openings corresponding with these pins or fingers, said openings being provided either in the web of the wheel, when the latter is of the solid type (cast, stamped, etc.) or in small plates 22 rigid with the rim, when the wheel is, for instance of the spoke-wheel type.

One of these openings is round, its diameter being equal to that of the corresponding pin 2. The other opening is rectangular (Figs. 6 and 7). The pin or finger corresponding to the last mentioned opening carries a rectangular (or square) part 23 adapted to slide radially in the corresponding opening 22ª of plate 22.

With this device, the fitting of the brake on any kind of wheel is extremely simple and an accurate centering is unnecessary.

In the case of spoke-wheels, an eventual deformation of the rim of the wheel has no detrimental effect on the working of the brake.

Furthermore, for any kind of wheel whatever, the braking action is wholly independent of a deformation of the axle (which may for instance take place in the case of an airplane making a forced landing) because the movable casing is constantly maintained in the plane of the ring-shaped plates.

Fig. 4 shows, by way of example, the mounting of a braking device according to the present invention on an airplane.

The compressed air fed from a reservoir 14 flows through a valve 13 into a pressure relief device 12, which will be fully described hereinafter, and is sent to the wheel brakes 10 through a distributor 11 which may for instance consist of a three way valve or of any other suitable device.

The pressure relief device which is shown in detail in Fig. 5 serves to control the flow of compressed air to the brake pipes. This air may act either directly on the walls of the expansible chamber or on a fluid that transmits the pressure to said expansible chamber.

In the state of rest, valve 15 is closed and spring 17 is not compressed. By depressing button 16, cup shaped member 18 is caused, through spring 17, to sink into seat 19, which is made of soft india-rubber. Valve 15 opens and allows air from the reservoir to flow into the pipe leading to the braking device. The counter-pressure that is thus produced causes cup-shaped member 18 to move upwardly, compressing spring 17, and valve 15 closes. A certain pressure now exists in the pipes leading to the braking device.

It follows that this pressure depends upon the tension imparted to spring 17 by the effort exerted upon the control knob or button 16.

By increasing this effort, the pressure of the air or other fluid that is fed to the braking device is correspondingly increased.

On the contrary, by reducing the pressure exerted on the control knob or button 16, the elastic force exerted by spring 17 on member 18 is reduced. This member 18 therefore moves upwardly under the effect of the pressure existing in the pipes of the braking device, and brings said pipes into communication with the atmosphere through ports 20 until the strength of spring 17, which is partly expanded, and the remaining braking pressure again balance each other.

When the control knob or button 16 is fully released, spring 17 is free to expand to the maximum and cup shaped member 18 brings the pipes of the braking device into communication with the atmosphere until the brake is fully released.

It will therefore be readily understood that, to every position of the control knob there corresponds a well determined braking effect.

It should be noted that when the control knob is suddenly depressed, it is still possible to obtain a progressive braking action, because of a certain resistance to the passage of air that can be created at the inlet end of the pressure relief device through which the braking device is controlled. On the contrary, when said control knob is suddenly released, the brake is suddenly released.

A kind of bayonet joint 21 serves to determine two essential positions of the control knob: The first position (I) limits the stroke of member 16 and consequently the pressure corresponding to a given braking action, for instance with a view to avoiding blocking the wheels. The second position (II) corresponds to the locking of the wheels by further depressing the control knob 16.

It will be noted that it is possible to check the working of the brakes when the vehicle is stationary, by depressing the control knob and reading the indications given by the corresponding pressure gauge (not shown in the drawings) fitted on the conduit.

The relief valve through which the braking device is controlled can be actuated not only through a pedal but also manually, by means of a handle, or even through a mere action of the thumb, which is particularly advantageous in the case of an airplane.

While I have, in the preceding description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claim.

What I claim is:

In a vehicle including a wheel and an axle for said wheel which does not rotate together with said wheel, a braking device, which comprises, in combination, a ring-shaped casing of U-shaped section carried by said wheel so as to rotate together with it but to be movable radially with respect thereto, a flat member rigid with said axle and at right angles thereto, three spindles parallel with the axis of said wheel carried by said member and extending on either side thereof, two annular friction plates extending inside said casing so as to be able to cooperate with the internal walls thereof respectively, said plates being provided with holes in which said spindles are slidably engaged, so that said friction plates are mounted in fixed angular relation with respect to said axle but are slidable with respect thereto in the direction of its axis, an expansible annular element mounted between said friction plates inside said casing, means for inflating said expansible element, a spring arranged to urge said annular friction plates toward each other, and shoulders carried by said spindles, on either side of said flat member rigid with the axle, adapted to cooperate with said annular plates when said plates are moved toward each other by said spring for limiting the inward sliding displacement of said plates along said spindles.

MAURICE CHARLES.